Sept. 27, 1955     G. S. BOHANNON ET AL     2,718,662
PLASTIC INJECTION MOLDING MACHINE
Filed Sept. 28, 1949     6 Sheets-Sheet 3

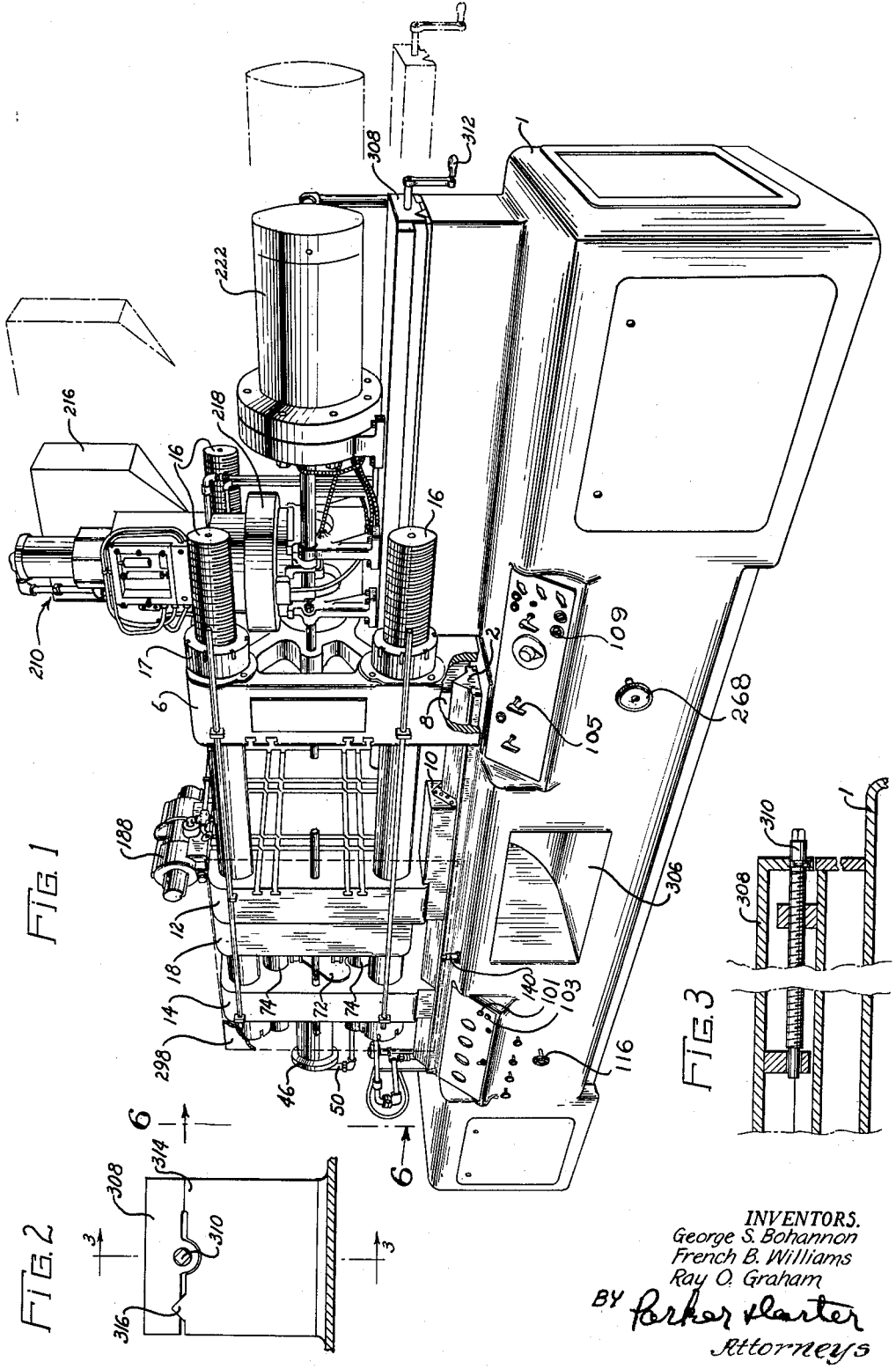

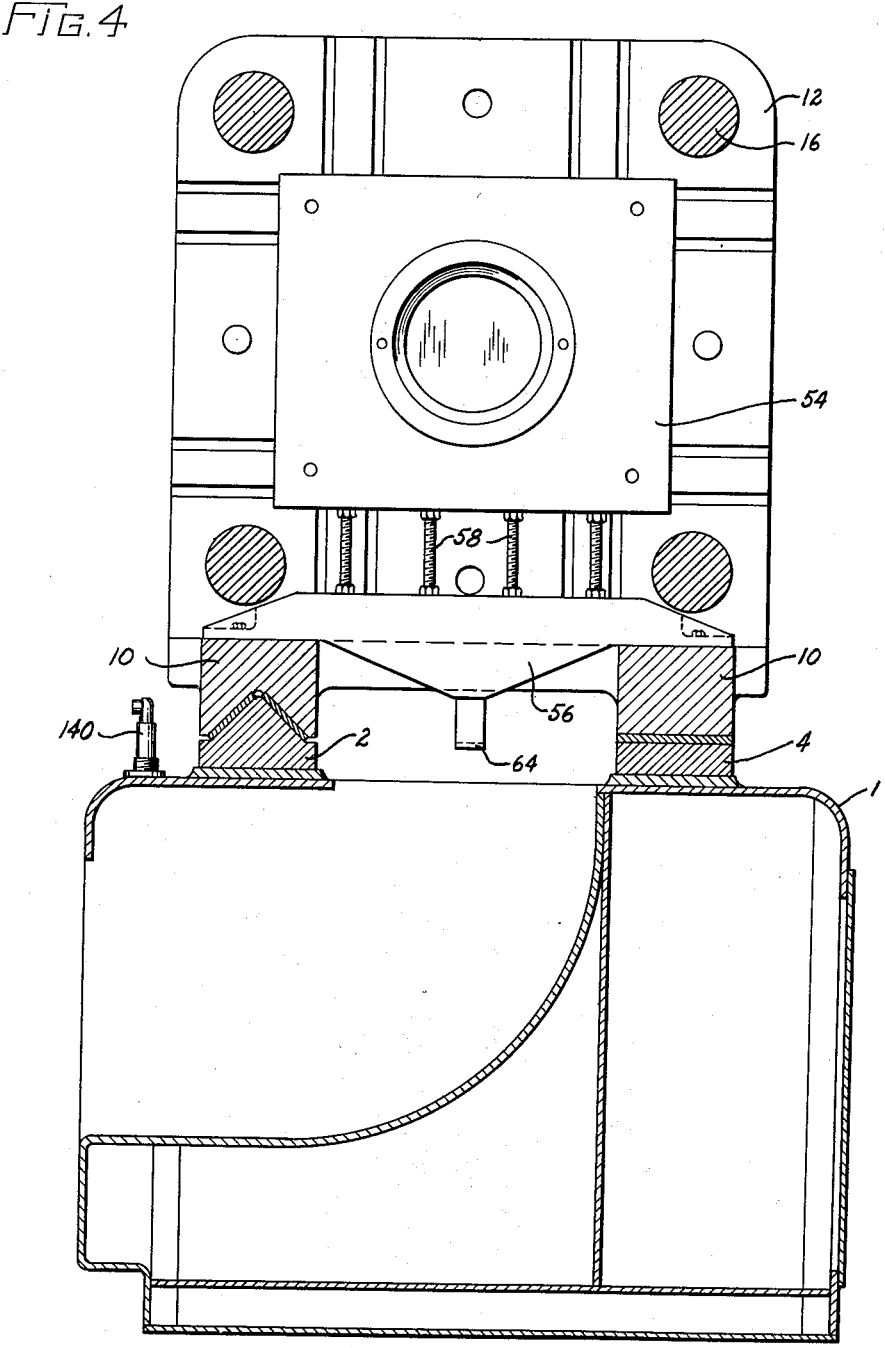

INVENTORS.
George S. Bohannon
French B. Williams
Ray O. Graham
BY Parker & Carter
Attorneys Sept. 27, 1955 G. S. BOHANNON ET AL 2,718,662
PLASTIC INJECTION MOLDING MACHINE
Filed Sept. 28, 1949 6 Sheets-Sheet 4
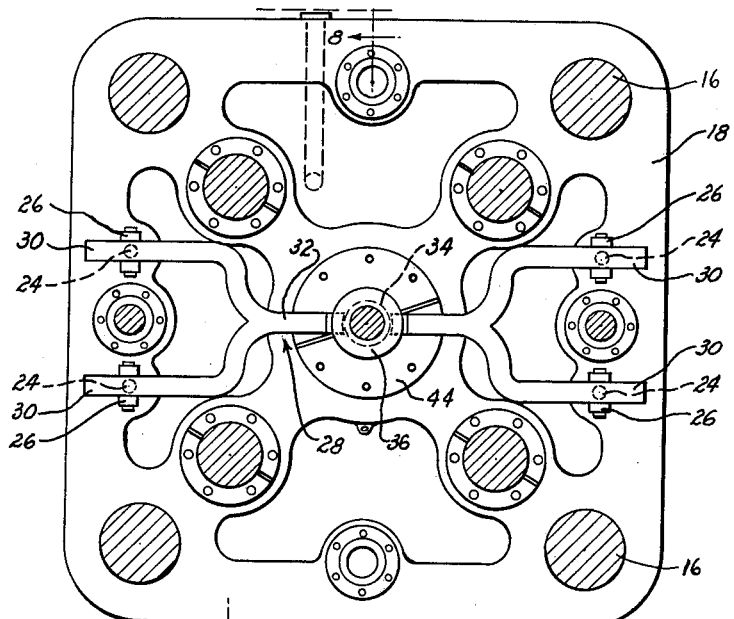
Fig. 7
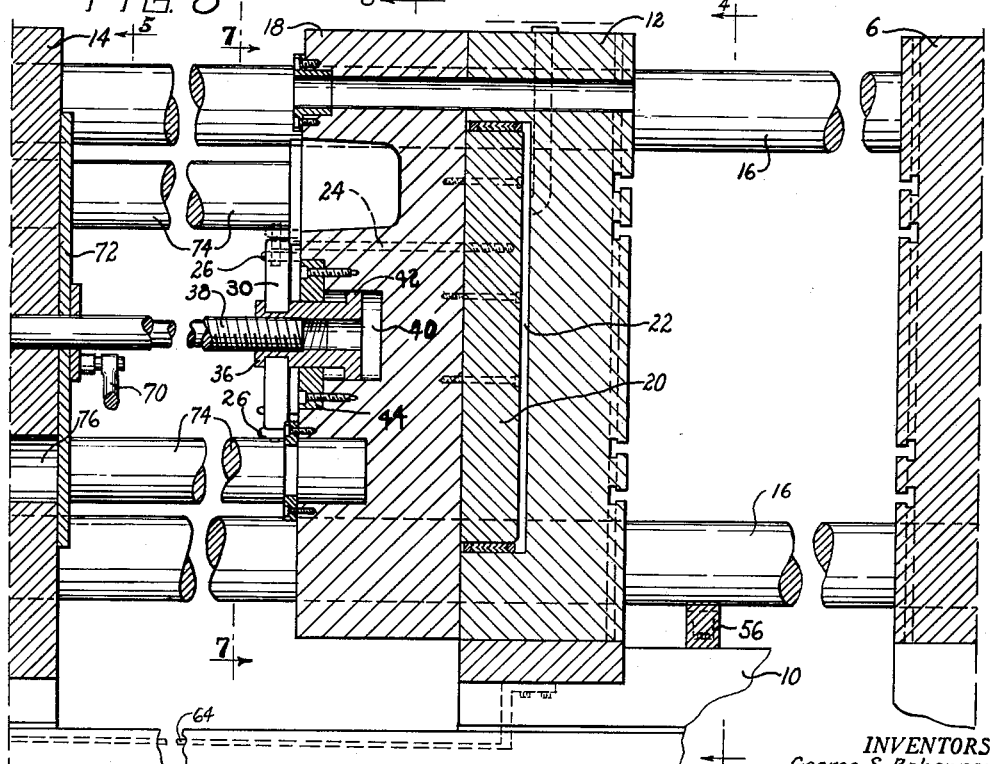
Fig. 8
Fig. 11
INVENTORS.
George S. Bohannon
French B. Williams
Ray O. Graham
BY Parker & Carter
Attorneys

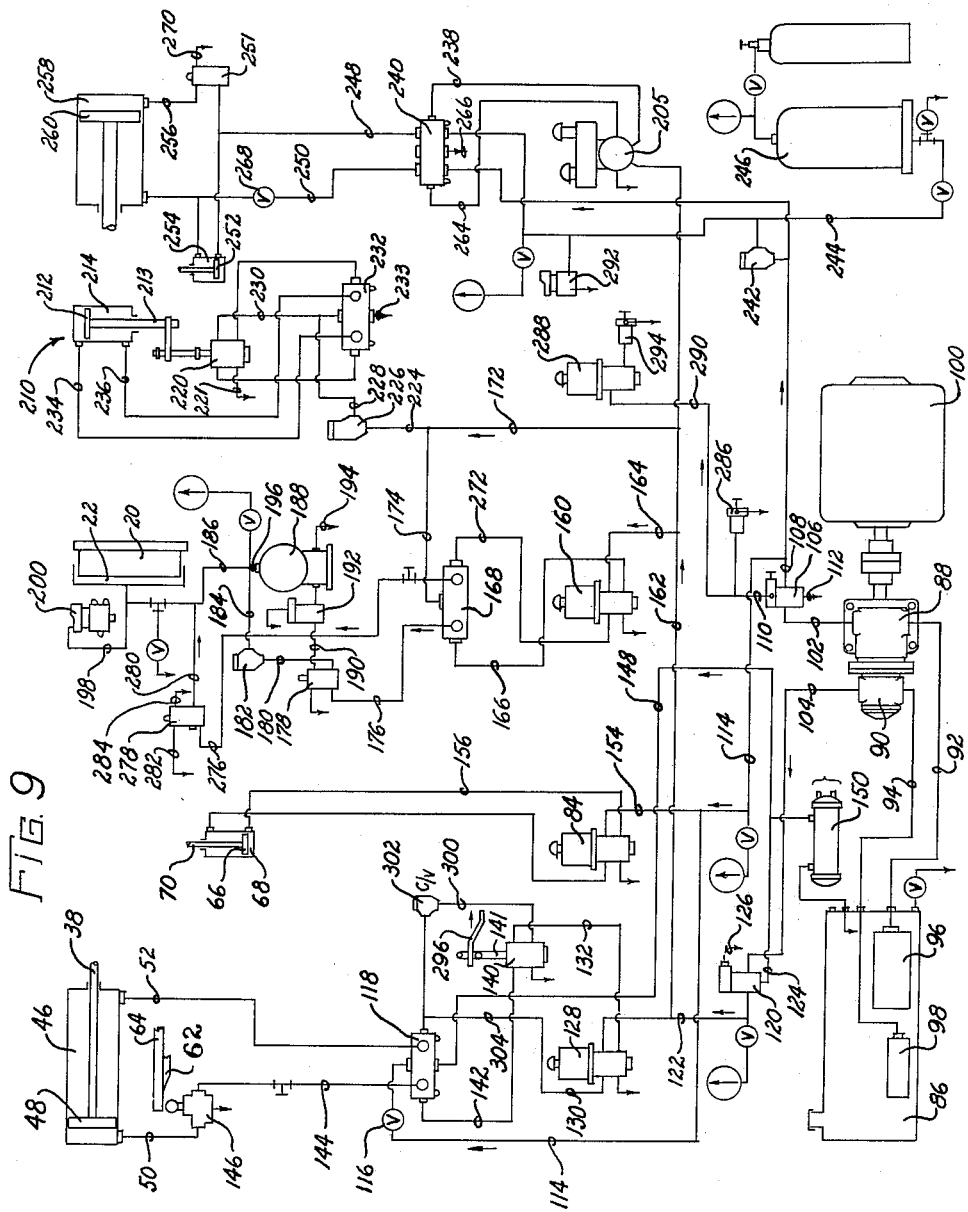

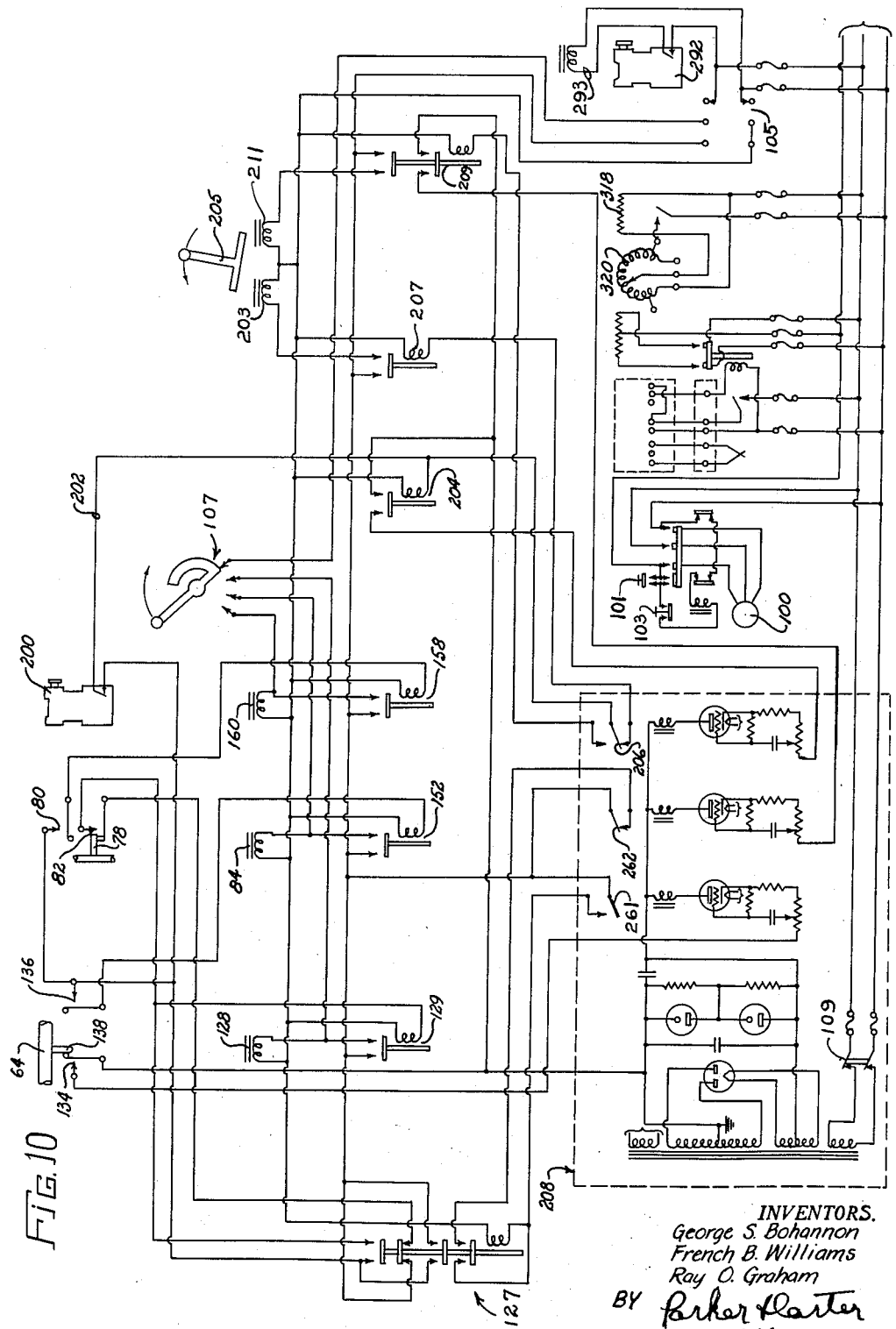

United States Patent Office 2,718,662
Patented Sept. 27, 1955

2,718,662

PLASTIC INJECTION MOLDING MACHINE

George S. Bohannon, French B. Williams, and Ray O. Graham, Fort Worth, Tex., assignors to Crown Machine and Tool Company, Fort Worth, Tex., a corporation of Texas Application September 28, 1949, Serial No. 118,242

19 Claims. (Cl. 18—30)

This invention relates to improvements in plastic injection molding machines of the character for molding plastic materials and particularly thermo-plastics.

This application has been directed to improvements in molding machines for molding thermo-plastics of the character as set forth in applications for patent filed by George S. Bohannon on Molding Machines, Ser. No. 710,116 now abandoned; filed November 15, 1946; Ser. No. 741,403 on Plastic Molding Machines, filed February 14, 1947 now Patent No. 2,501,595; and Ser. No. 74,991, filed February 7, 1949 now abandoned, on Pressure Equalizing Cylinder for Molding Machines.

The object of this invention is to improve the construction of molding machines for this purpose and to provide for a faster molding cycle, particularly in the molding of large objects; and to simplify and reduce the cost of machines for this purpose and to obtain improved molded products.

Another object of this invention is to provide a molding machine having a relatively small piston using a small volume of fluid for a relatively long range of travel, for the initial, primary closing operation of the mold, and a relatively large secondary piston for cooperation therewith having a relatively short stroke under which fluid is supplied at relatively high pressure for obtaining a secondary closing of the mold members, after the completion of the primary piston's initial closing, and also for a quick opening of the mold members by the reverse cycle.

Another object of this invention is to provide a molding machine in which the fluid is automatically expelled from the relatively large cylinder upon the completion of the molding operation.

Another object of the invention is to provide a thrust plate on the molding machine for maintaining the mold members relatively close together to enable the relatively large hydraulic cylinder pressure mechanisms by a relatively short travel to transfer the thrust to a rigid frame, to give additional pressure to the closed mold.

Another object of this invention is to provide a molding machine in which the mold receiving elements are mounted on ways on the upper surface of the base member in such manner as to adjustably support any over-hanging mold member so that the weight will be supported directly by the ways, relieving, the tie bars of deflection due to excessive mold weight.

Another object of this invention is to provide a plasticizing unit in which the granular material is fed into a preplasticizing unit and then the plasticized plastic is fed into the injection cylinder by a hydraulically operated feed plunger, and lastly into the mold cavity by a hydraulically operated injection plunger.

According to one embodiment of the invention, the machine is constructed so as to plasticize the material before it is directed into the injection chamber, whereby the injection plunger serves the purpose only of forcing the material into the mold. Therefore the injection is much more effective in terms of pressure in the mold, since the injection plunger has only this one function, and is not required to force granular material into the chamber. This greater efficiency makes possible the production of perfect moldings of plastic material at comparatively low pressure on the injection plunger, whereas, other machines in use heretofore, would have required considerably greater pressure when the plunger thereof was required to force the granular plastic or unplasticized material into a plasticizing chamber and therethrough into the mold.

It is a further object of the invention to improve the manner of plasticizing the material in the machine. In order to obtain maximum efficiency, the internal shape of the plasticizing chamber is so constructed that there is a rapid increase in volume from the point at which the granular material enters to a point at which the maximum plasticity is reached, where the material becomes a viscous liquid. It is in the form of a viscous liquid when directed into the injection cylinder, and may be handled more efficiently for better molding action.

The present machine also contains the improved features of: (1) A base that has longitudinal ways formed thereon, which support a movable mold receiving element or platen in aligned relation with a stationary mold receiving element or platen mounted on the base. The movement and adjustment of the movable mold receiving element along the ways on the base permits the mold members to be adjusted to accommodate various size molds to hold them in true alignment. (2) A relatively small, long stroke fluid cylinder for operating one of the molding elements and a relatively large cylinder and piston for a comparatively short stroke and subject to high pressure for the final closing of the molds. (3) A positive back-up element to prevent the movement of the molding element, when the molding machine is closed and receiving an injection of thermo-plastic; (4) The machine is provided with an automatic cycle and a manually operated cycle.

A preferred embodiment of this invention is illustrated in the accompanying drawings, in which:

Fig. 1 is a perspective view of the invention showing the front, end and top thereof, with parts broken away and shown in section to illustrate the details of construction, and showing the safety door open and partially broken away and shown in dashed outline, and a portion of the machine is shown in dot-dash outline, to illustrate movement of the plasticizing chamber to an "out" position to give easy access to the machinery;

Fig. 2 is a fragmentary end view of the plasticizing chamber support members;

Fig. 3 is a sectional view taken on the line 3—3 of Fig. 2 looking in the direction indicated by the arrows; and with parts broken away and shortened to bring out the details of construction;

Fig. 4 is a sectional view taken on the line 4—4 of Fig. 8, looking in the direction indicated by the arrows;

Fig. 7 is a sectional view taken on the line 7—7 of Fig. 8, looking in the direction indicated by the arrows;

Fig. 8 is a fragmentary longitudinal view, partly in section, through the platen portion of the machine;

Fig. 9 is a diagrammatic view of the hydraulic system of the machine;

Fig. 10 is a diagrammatic view of the electrical system of the machine; and

Fig. 11 is a top plan view showing one of the yoke members and a fragmentary sectional view of the piston carrying member and showing the relation of the yoke member thereto.

Figure 5:
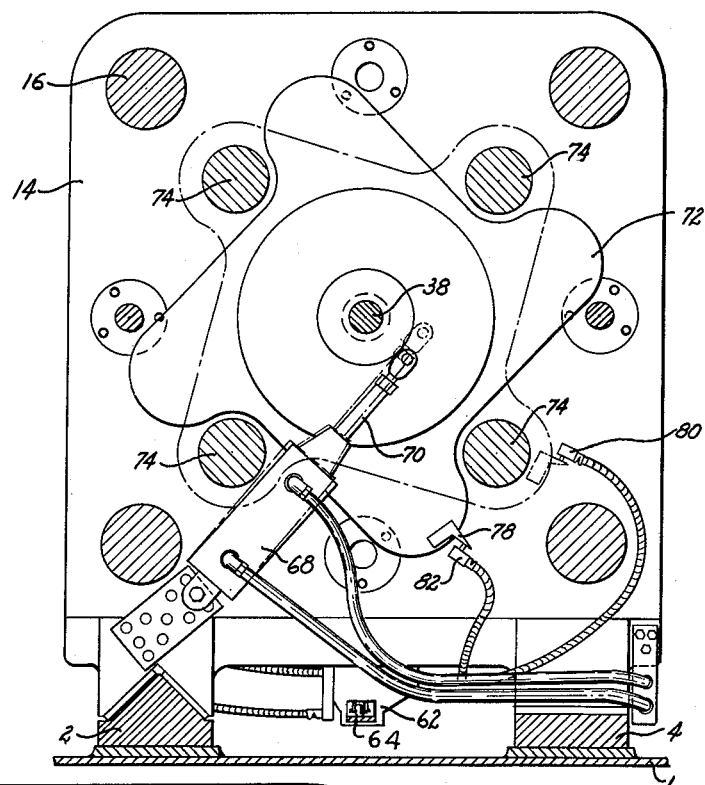
Fig. 5 is a sectional view taken on the line 5—5 of Fig. 8, looking in the direction indicated by the arrows.

With more detailed reference to the drawing the numeral 1 designates a base which may be of cast or welded construction, and which may be hollow, as indicated in Fig. 4, to receive such mechanism as is necessary to operate the machine. The base 1 has ways 2 and 4 thereon, as indicated in Figs. 1, 4, 5, and 6. The way 2 is preferably of V-form, while the way 4 is preferably flat. A head or stationary platen, which for convenience I call the first or front support, 6 is carried on the base 1, near the injection end of the machine, as will best be seen in Fig. 1. It is preferable to have recess 8 at the inner end of each of the ways 2 and 4, to enable extensions 10 of a movable platen or molding element 12 to telescope into the respective recesses. Also mounted on the ways 2 and 4 is a back-up member 14 which for convenience I call the second or rear support. The ways 2 and 4 are finished to a high precision tolerance to enable true aligned movement of platen member 12 and back-up member 14 so as to maintain these in aligned relation with the stationary platen or head 6. Since the ways 2 and 4 are mounted on the heavily constructed base 1, the likelihood of misalignment due to the weight of the movable platen 12 and back-up member 14 and the accessories incident thereto, is lessened.

Figure 6:
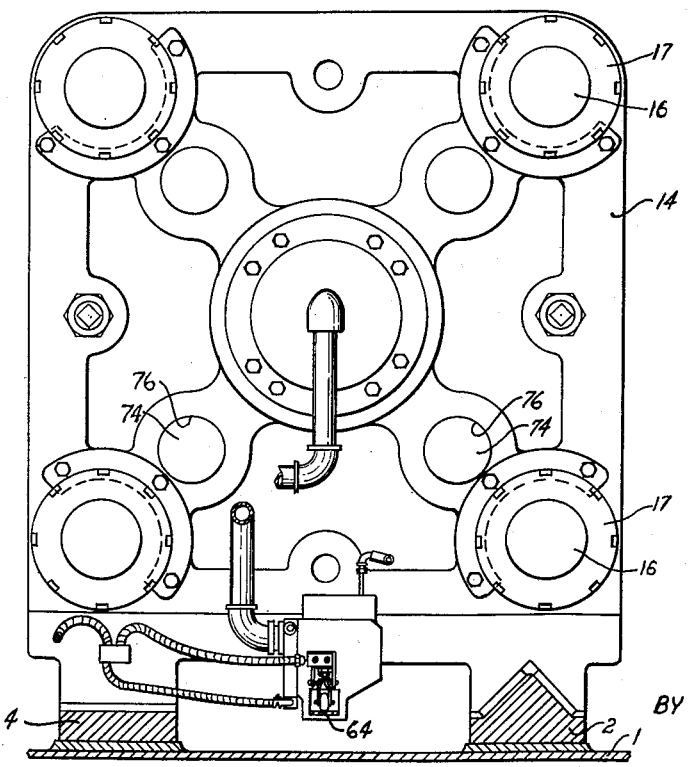
Fig. 6 is a sectional view taken on the line 6—6 of Fig. 1, looking in the direction indicated by the arrows.

The movable platen 12 may be adjusted along the ways and the stationary platen 6 and back-up member 14 may be secured in place to the base 1 by tie rods 16 passing through stationary platen 6 and back-up members 14, as shown in Figs. 1, 5, and 6.

The movable platen 12 is mounted on ways 2 and 4 for sliding action therealong and for movement on tie rods 16, each of the tie rods 16 having a nut 17 threaded thereon. The platen 12 also carries a companion piston carrying member 18 attached thereto by a loose linkage and movable therewith, which member 18 has a piston 20 secured thereto for interfitting relation with cylinder 22 in platen 12.

The movement between piston carrying member 18 and platen 12 is very limited, just sufficient to give the final closing to the mold, usually only a fraction of an inch, since it exerts a very high pressure. Rods 24 pass through piston carrying member 18 and are threaded into the side of the platen 12 adjacent piston carrying member 18. Each of the outer ends of rods 24 carries a clevis 26, which clevises are attached to yoke members 28, the ends of which yokes extend outward, as indicated at 30 and are in position for contact relation with the rear face of piston carrying member 18, while each inner end of the yoke member has a finger 32 which is enengageable in an annular recess 34 on a nut 36 formed on the inner end of piston rod 38. The nut 36 extends into a recess 40 in piston carrying member 18 and has an outturned flange 42 interfitting for sliding relation therewith. A split ring 44 encompasses the nut 36 and is secured to piston carrying member 18 by bolts which are screw threaded thereinto.

The inner diameter of the split ring 44 is adapted to fit snugly around the nut 36 so as to engage annular flange 42 to prevent the nut from becoming disengaged from the piston carrying member 18. This will allow limited movement of annular flange 42 within recess 40, which in turn, enables yoke member 28 to move a limited distance, upon outward movement of piston rod 38 to cause the ends 30 of the yokes to engage the rear face of piston carrying member 18, which will cause the clevises 26 and threaded rods 24 to be drawn outward and to move piston carrying member 18 inward to perform a squeezing action between piston carrying member 18 and movable platen 12, so as to expel hydraulic fluid from the cylinder 22.

The piston rod 38 extends rearward and passes through back-up member 14 and extends into a double acting cylinder 46 which has a relatively small diameter and a relatively long stroke and requires a comparatively small volume of fluid and a comparatively low pressure to obtain the full length of travel. This cylinder 46, which has a piston 48 therein, is mounted on the back-up plate 14 and extends rearward therefrom. Pipes 50 and 52 lead respectively from opposite ends of cylinder 46, which cylinder is supplied with a fluid medium, as will be more fully described hereinafter.

Due to the excessive weight of molds of large size, provision has been made for supporting the weight of the mold 54 on extension members 10, by the provision of a bridging element 56 having jack screws 58 intermediate the bridging member 56 and the mold member 54, which causes the mold 54 to be supported on extension members 10, thereby transferring the weight of the mold directly to the ways 2 and 4.

The tie rods 16 have nuts 17 threaded on each end thereof for adjustment of back-up plate 14 relative to stationary platen or head 6, so as to properly position the movable platen 12 with respect to stationary platen 6 to accommodate molds of various sizes, as well as the opening between said molds.

The various articles that are molded from plastic require that the molds open varying distances, and to provide for this varying degree of opening, the cylinder 46 and piston rod 38 are connected with piston carrying member 18, as hereinbefore described, and are adapted to move the piston carrying member 18 and the movable platen 12 any desired predetermined distance.

In accordance with the setting of the cam 62 on gauge bar 64, the distance of movement of piston 48 and movable platen 12 is controlled, so as to make possible the correct opening and closing travel of these members at high speed, in accordance with the size of the particular article being molded.

After the piston 48 has moved the movable platen 12 so that the mold member 54 is substantially closed, piston 66, in cylinder 68 moves piston rod 70 which piston rod 70 is connected to a rotary thrust plate 72, so that the thrust plate 72 will be rotated from the position as shown in full lines, to the position as shown in dot-dash lines, in Fig. 5. This moves the thrust plate between the outer ends of compression bars 74, which compression bars are mounted on piston carrying member 18, and the inner face of back-up member 14, which will prevent the compression bars 74 from passing through holes 76 in back-up member 14. The thrust plate 72 carries a lug 78 thereon, which lug is adapted to move into contact with limit switch 80 to operate a relay 158 which in turn operates solenoid control fluid valve 160, and switch 82 operates a holding coil 129 and solenoid valve 128 as will be more fully described hereinafter.

A reservoir 86 is provided, which reservoir supplies hydraulic fluid to pumps 88 and 90, through lines 92 and 94, respectively. Each of the conduits 92 and 94 have screens or filters 96 and 98 on the respective ends thereof within the reservoir 86, so as to insure a clean fluid supply to the pumps 88 and 90. The pumps 88 and 90 are driven by a suitable power unit, such as an electric motor 100.

The pump 88 directs fluid outward through conduit 102 to the various valves, where it is directed to the various hydraulic motor actuating mechanisms throughout the hydraulic system, for coordinated hydraulic movement of the component mechanisms of the machine. This pump 88 has a large volume capacity, at a medium high pressure, while the pump 90 is a comparatively small volume pump which is designed to operate at relatively high pressure, and which pump 90 directs hydraulic fluid into conduit 104 to the various mechanisms that require a comparatively small volume of fluid at high pressure.

The pump 88 directs fluid through conduit 102, to and through a relief valve 106, which has conduits 108, 110 and relief conduit 112 leading therefrom. The relief conduit 112, which shows an arrow pointing downward, returns the hydraulic fluid through a suitable conduit to reservoir 86. All valves and pipes having arrows pointing downward, with the exception of the drain for the reservoir, indicate a discharge for used or excess hydraulic fluid, and while a return conduit is not necessary for the operability of the system, a common conduit will direct the fluid back into reservoir 86 for reuse, however, for the sake of simplicity, and clarity of the drawings, this conduit has not been shown.

The conduit 108 connects with a conduit 114 which leads to and through a manually operated valve 116 to a switching valve 118. A static pressure is maintained on the inlet port of this valve all the time the pump 88 is operating. The pump 90 directs hydraulic fluid through conduit 104, to and through relief valve 120, which directs the fluid out through conduits 122, 124, and relief conduit 126. The hydraulic fluid that is directed through conduit 122 is directed to a solenoid pilot valve 128. By the arrangement within the valve, the fluid is directed alternately into conduit 130 and into conduit 132 by the energizing of solenoid valve 128 upon the closing of limit switch 134 or 136. The closing of the limit switches 134 and 136 is accomplished by a cam or finger 138 positioned on gauge bar 64, which gauge bar is attached to and movable with piston carrying member 18. When the solenoid valve 128 switches to direct hydraulic fluid into conduit 132, safety control valve 140, and normally through conduit 142 to move a piston within four-way pilot switching valve 118 to a position to direct fluid from pump 88 through conduit 114 into conduit 144 to and through cam actuated travel limiting valve 146 to the outer end of cylinder 46. This will normally move piston 48 within cylinder 46 to move piston rod and piston carrying member 18 ahead, to initially close the mold by the normal pressure of the pump 88, as exerted on the piston 48. During the closing, inward movement of piston 48, the hydraulic fluid is exhausted through conduit 52, through four-way switching valve 118 to return through conduit 148, and cooler 150 back to the reservoir 86.

When piston 48 has made its inward stroke, the limit switch 136 will be closed to energize relay 152, which closes a circuit to operate solenoid valve 84, which directs hydraulic fluid from conduit 114 into conduit 154 to solenoid valve 84 into conduit 156, which will move piston 66 and piston rod 70 outward, which will rotate rotary thrust plate 72 on a pivot about piston rod 38 and the lugs on the outer periphery of the thrust plate 72 will rotate behind compression bars 74 so as to present an obstruction between the outer ends of the compression bars 74 and the inner face of back-up member 14. In so doing the compression bars 74 and piston carrying member 18 are prevented from rearward movement, whereupon the lug 78 on thrust plate 72 will close limit switch 80 to energize relay 158, which will allow current to pass to solenoid valve 160 to be energized thereby, then fluid will be directed from pump 90 through conduits 104, 122 and 162 into conduit 164 through solenoid valve 160 into and through conduit 166 to direct fluid pressure to the end of a piston in four-way pilot valve 168, which shifts the valve 168 to a position that permits hydraulic fluid to be directed from pump 90 through conduits 104, 162, 172 and 174 to and through four-way pilot control valve 168 to be directed through a conduit 176 through sequence valve 178, and normally through check valve 182 into conduit 184 and 186 into cylinder 22 to exert a predetermined pressure from pump 90 on piston 20. In this manner the movable platen 12 is moved ahead only a fraction of an inch and at exceedingly high pressure, and the piston carrying member 18 is restrained from rearward movement by compression bars 74 being in contact relation with thrust plate 72 which transmits the thrust to back-up member 14 so as to put bars 16 in tension to exert a squeezing for final closing action on mold 54 against the complementary mold member mounted on stationary platen 6. When the piston 20 moves ahead until a static relation is reached, that is, when a predetermined back pressure upon sequence valve 178 is built up, the back pressure will cause valve 178 to shift to direct fluid from conduit 176 through valve 178 into conduits 180 and 190.

The hydraulic fluid passing into conduit 190 and into relief valve 192 furnishes the motivating fluid to actuate the hydraulic ratio booster pump 188, with the fluid exhausting into conduit 194 to return to the reservoir 86. Any ratio booster may be used to boost the pressure of the hydraulic fluid that is drawn through conduit 190 and relief valve 192 into booster pump 188. Upon the actuation of the hydraulic boosting mechanism within booster 188, the hydraulic fluid is drawn in through conduit 190 and discharged through conduit 196, which will cause the check valve 182 to close, thereby discharging the hydraulic fluid under increased pressure, into conduit 186 into cylinder 22 to move piston 20 ahead to give the desired pressure for final squeeze in closing the mold members 54.

Upon the mold 54 being closed in fluid tight relation with the companion mold member (not shown) mounted on stationary platen 6, the back pressure exerted in conduit 198, which is in fluid communication with cylinder 20, causes the actuation of pressure switch 200 to close an electric circuit 202 which leads to relay 204 and to electronic timer switch 206. The electronic timer element generally designated 208, is of the character described in patent applications Ser. No. 710,116 and Ser. No. 741,403 filed by George S. Bohannon, and may be set for any desired length of time, to operate the various electric relays to cause timed, step by step operation of the various electrical elements, as will be more fully described hereinafter.

The plasticizing unit, generally designated at 210, has a hydraulic motivated type piston 212 with cylinder 214, which feeds granular plastic from hopper 216 into and through a plasticizing chamber 218, which is substantially of the same construction as disclosed in patent application Ser. No. 741,403 filed by George S. Bohannon. The length of the stroke of piston 212 and plunger 213 is controlled by a pilot slide valve 220, which alternately directs hydraulic fluid to opposite ends of cylinder 214.

The granular plastic is fed from hopper 216 into preplasticizing chamber 218 in such manner as to keep molten plastic continuously supplied to the injection cylinder, which is mounted on the lower end of the preplasticizing chamber 218, substantially as disclosed in the prior application Ser. No. 741,403 filed by George S. Bohannon and application Ser. No. 74,991 by the same applicant. A piston within the cylinder 222 actuates the injection plunger to inject the molten plastic into injection mold 54, in timed sequence as regulated by electronic timer 208.

With the granular plastic being fed into the plasticizing chamber 218, and into the injection cylinder, the piston 212, which is supplied with hydraulic fluid through conduit 224 leading through check valve 226 through a conduit 230, which directs part of the fluid into four-way switching valve 232 and into the port side of valve 220.

The fluid that is directed into conduit 230 passes into valve 220 and is directed alternately to opposite ends of four-way switching valve 232 to actuate the piston therein which directs fluid from conduit 228 alternately to conduits 234 and 236 which will cause reciprocating movement of piston 212 in cylinder 214 to actuate the plunger 213 as needed. The fluid that escapes from valves 220 and 232 is returned to the reservoir 86 through discharge conduits 221 and 233, respectively. The main function of the plasticizing unit generally designated at 210, is for the operation independently of the other mechanism, to keep molten plastic to the injection plunger at a predetermined pressure, for injection in accordance with a timed sequence, as will be more fully described hereinafter.

When the pressure in cylinder 22 reaches a predetermined amount, the switch 200 is closed, which allows the current to pass through conductor 202 to relay 204 and through switch 206, to energize relay 207, and at the same time energize a solenoid coil 203 of a four-way pilot valve 205, which shifts the valve mechanism so as to direct fluid from pump 90 and conduit 162 through valve 205 into conduit 238 to one end of double pressure port valve 240, which in turn, directs fluid from pump 88 into pressure relief valve 106, conduit 108 into and through double pressure port valve 240, which fluid is under medium high pressure, with the pump 88 operating continuously, the fluid is either directed out of conduit 108 through check valve 242 into conduit 244 into a pressure accumulator 246, the fluid will be directed in this manner until a maximum predetermined pressure is reached. Then the fluid under pressure will escape through relief valve 106 and outlet 112 back to the reservoir 86. When the fluid within accumulator system 246 and conduit 108 has built up a predetermined amount of pressure, the double pressure port valve 240 will direct fluid alternately into conduits 248 and 250 to exert pressure on sequence valve 251 and on piston 252 in cylinder 254, respectively.

When the pressure is applied to cylinder 254, the piston 252 will be moved to move a valve which opens the injection nozzle for the injection of plastic into mold 54 in accordance with the timed sequence of the timer 208. At the same time, pressure is directed into cylinder 254, the sequence valve 251 will be operated to direct hydraulic pressure from pump 88 into conduit 248 and into conduit 256 leading to the outer end of cylinder 258 to move piston 260 therein, for the injection of molten plastic into mold 54. The sequence valve 251 is so arranged as to give a sequential passage of fluid into conduit 256, slightly after the full opening of the nozzle injection valve which is actuated by the piston 252.

After the piston 260 has made its inward stroke to inject the preplasticized plastic into mold 54, the electronic timer will hold the plunger in an "in position" for a predetermined time, sufficient to allow for the cooling of the plastic within the mold 54.

After the plastic within the mold 54 has cooled sufficiently, a switch is closed which will actuate a solenoid control valve 205 to switch the hydraulic fluid from conduit 162 to conduit 264 to permit the motivating fluid within the valve 240 to discharge through relief conduit 266 back to the reservoir 86.

When the fluid is discharged the valve mechanism within double pressure port valve 240 will shift so as to direct fluid from conduit 108 through valve 240, conduit 250 and manually operated valve 268 into the inner ends of cylinders 254 and 258 so as to close nozzle valve upon movement of piston 252 and withdraw injection plunger upon the outward movement of piston 260. The fluid discharged from cylinders 254 and 258 will pass out through relief conduit 270 leading from sequence valve 251, and return to reservoir 86.

Upon the completion of the molding cycle, as dictated by the mold closing section of the electronic timer 208, relay 158 is de-energized, which in turn will cause the opening of valve 160, which will direct fluid through conduit 272 to cause valve 168 to shift, which will direct fluid from conduit 174 into conduit 276 to pilot operated unloading valve 278, which valve is normally closed, to open this valve and enable fluid under pressure in cylinder 22 to escape and return to the reservoir 86 through conduit 280 and relief conduit 282. The motivating fluid necessary to actuate the pilot unloading valve 278 escapes through relief conduit 284 and returns to reservoir 86 at the completion of each cycle.

The relief valve 106 is of the hydro-cone type and is controlled by venting remote pilot valve 286, and in so doing, the pressure may be maintained at any given amount, either manually or by connection with pressure control elements. A solenoid controlled valve 288 is connected to relief valve 106 by conduit 290 and is operably controlled by pressure switch 292, which switch is responsive to the pressure in the accumulator system 244—246. This solenoid control valve 288 is of such construction as to select scondary relief valve 294, when a predetermined pressure in the accumulator is reached.

A cam member 296 is provided on safety door 298 to engage valve plunger 141 to shift the valve member within the valve 140, so that upon opening of the safety door 298, the hydraulic fluid is directed from solenoid valve 128 and conduit 132 through valve 140 into conduit 300 into check valve 302 to exert pressure on the piston within pilot controlled switch valve 118, so that the pressure from pump 88 will be directed through conduit 114, valve 116, through pilot control switching valve 118 into conduit 52 to direct hydraulic fluid into cylinder 46 to cause the opening of the mold member 54, if the mold is in closed position. The check valve 302 will prevent the return of fluid from line 52 from passing through valve 140. All hydraulic motivating valves having a conduit indicated by an arrow pointing downward, indicates that the relief fluid necessary to operate the valve is returned to the reservoir 86 upon the completion of the motivating function.

After the molding cycle is completed, the mold opening section of the electronic timer 208 will reverse the sequence of the closing operation. The solenoid valve 84 will be actuated to direct hydraulic fluid into the inner end of cylinder 68 which will rotate thrust plate 72 until lug 78 mounted thereon contacts limit switch 82, at which time a relay 129 is energized to close a circuit through solenoid valve to direct hydraulic fluid to pilot operated valve 118 through conduit 304, to shift the valve mechanism within the pilot controlled switching valve 118 so as to direct fluid from conduit 114 into conduit 52, to direct fluid into the inner end of the cylinder 46 to move movable platen 12 along ways 2 and 4 to enable the ejection of the molded plastic article out of the mold 54 and out through chute 306.

As illustrated in Figs. 1, 2, and 3, the plasticizing unit 210, cylinder 222 and the injection nozzle (not shown) are mounted on a movable bed member 310. A crank 312 is provided to enable the screw member to be turned to move the bed plate 308 and the mechanism carried thereon rearward on ways 314 and 316 to give ready access to the plastic unit 210 and to the injection nozzle carried thereby. The pre-plasticizing unit has heating element 318 therein, and a suitable manual heat control 320, as well as suitable thermo-heat controls, such as set forth in the prior application of George S. Bohannon Ser. No. 741,403. The injection nozzle and heating unit in the present application being substantially as disclosed therein.

A travel limiting valve 146 is provided which is actuated on its outward movement by a cam 62 on gauge bar 64. This prevents any damage to the machine, should limit switch 134 fail to operate. A manually controlled valve 116 is provided within conduit 114 so as to manually control the inward movement of piston 48 to close the mold.

*Operation*

To put the machine in operation, the motor switch 101 is turned on, which will energize motor 100 to operate hydraulic pumps to supply hydraulic pressure to all hydraulic parts of the machine. The timer switch 109 is then turned on and the necessary time allowed for the heating elements to become heated. The machine is prepared for automatic operation, by turning selector switch 105 to a selected position. The master relay 127 is energized through the timer relay 261 which has previously been energized through the timer circuit. The master relay 127 energizes the relay 129, which in turn energizes the solenoid 128 which moves piston 48 inward within cylinder 46. At the end of this stroke, cam 138 trips limit switch 136 to supply current to relay 152. Relay 152 then energizes solenoid valve 84 which actuates cylinder 68. The piston 66 in cylinder 68 operates a thrust plate 72 for locking platens 6 and 12 in spaced relation. When the piston 66 in cylinder 68 has reached the end of its locking stroke, the cam 78 fastened thereto, trips limit switch 80. This supplies current to relay 158, which in turn energizes solenoid valve 160. The solenoid valve 160 directs hydraulic fluid through booster pump 188 into cylinder 22 thus putting the final pressure for closing the mold 54. When a predetermined pressure is reached in cylinder 22, pressure switch 200 is tripped which energizes relays 204 and 207. Relay 204 starts the plunger's "in" time, while relay 207 energizes solenoid 203 of four-way valve 205 which directs hydraulic fluid through four-way valve 240 to close nozzle valve cylinder 254 and to injection cylinder 258. When the predetermined plunger "in" time has elapsed, which was started by relay 204, timer relay 206 is energized. This breaks the circuit to relay 207 and completes a circuit to relay 209 energizing solenoid 211 which directs hydraulic fluid through four-way valve 240 to open the passages from cylinder 254 and cylinder 258 respectively. Relay 209 also starts the mold "closed" time. When the mold "closed" time has elapsed, timer relay 262 is energized which de-energizes relay 127. When master relay 127 is de-energized this breaks the circuit on relay 152 and 158. When relay 153 is de-energized this breaks a circuit to solenoid 160 which reverses the flow of hydraulic fluid through four-way valve 168 to allow cylinder 22 to unload through valve 278. When pressure is reduced in cylinder 22, relay 209 is automatically de-energized by pressure switch 200. When circuit to 152 is broken, solenoid 84 is de-energized, reversing the flow of hydraulic fluid to cylinder 68 thus causing piston 66 to return which opens or unlocks the platens. When the piston 66 in cylinder 68 has reached the end of its "open" stroke, cam 78 trips limit switch 82, breaking the circuit to relay 129. This de-energizes solenoid valve 128 which reverses the flow of hydraulic fluid through four-way valve 118, thus causing piston 48 in cylinder 46 to move outward. When piston 48 in cylinder 46 reaches the end of its stroke, one cycle has been completed. At the same time cam 138 trips limit switch 134 which starts the mold "open" time. When the mold "open" time has elapsed it energizes timer relay 261 which duplicates the cycle above described.

In closing together the platen 6 and the movable platen 12, carrying the mold 54 thereon, the piston 48 moves these members together until they are in contact relation, at which time rotary thrust plate 72 mounted on the back-up member 14 is swung around an axial pivot between compression bars 74 and back-up member 14 by a piston 66 within cylinder 68. Then upon application of hydraulic pressure by booster element 188 to the cylinder 22, the platen 12 and stationary platen 6 will cause molds 54 to be closed in fluid tight relation. The injection nozzle, as shown and described in prior application Ser. No. 741,403, is moved into place and the pre-plasticized plastic is injected into the mold by a piston 260 within cylinder 258, before the nozzle valve, operated by piston 252 is opened. Upon the closing of the injection valve and the return of the piston 260 in cylinder 258, the pressure is released from cylinder 22, and upon movement of piston 20, the movable platen 12 is moved to the left to expel the hydraulic fluid, then thrust plate 72 is rotated to permit the opening of the mold. The ejector bars 322 contact the ejecting mechanism within the mold 54 to eject the molded plastic article upon the rearward movement of platen 12, which will permit the molded article to drop downward through throat 306 into a suitable receiver.

The present machine is versatile in use and may be adjusted over a wide range of applications. A machine of moderate length may be utilized in connection with the present design for the production of unusually large plastic articles, for which it has been necessary heretofore to use a machine of much larger and heavier proportions.

By the dual action of the cylinders 46 and 22 operating to perform two separate functions, with the piston 48 within cylinder 46 performing a travel function of comparatively long distance at a comparatively low pressure, and the piston 22 performing a high pressure function for only a fraction of an inch of travel, which eliminates the necessity of pumping a considerable amount of hydraulic fluid into a large cylinder to obtain the travel, when only a fraction of an inch of movement of the cylinder, after it is in position to perform the high pressure action of closing the mold members in fluid tight relation, is necessary.

It is to be pointed out that the molding machine is particularly adapted to the production of large plastic molded articles, and that it possesses the characteristic of opening and closing the platen member 12 quickly, by the use of a small volume of fluid through a long stroke cylinder 46 and plunger 48, and then rotating a positive abutment to form a shear plate 72 behind compression bars 74 to enable the use of a large cylinder with a very short travel for the final closing of the mold under very high pressure.

This arrangement makes it possible for the machine to handle large molded objects to be built comparatively light, with a fast operating cycle and with a single cylinder of large size for the final closing under high pressure. If a machine for such large castings was used that employed a single large cylinder for both operations, the machine would be so large and expensive as to eliminate the molding of large articles for the competitive market.

The present machine possesses the feature of a platen traveling upon ways to insure the exact closing of the mold in exactly the same relation each time the closing cycle is performed and without exerting lateral strain on the tension members which hold the back-up member 14 and the stationary platen in spaced relation, while the mold closing pressure is being exerted by the piston 20.

The molding machine also presents the feature of ready accessibility to all parts, by mounting the injection cylinder 222 on a bed plate 308 so that the bed plate may be moved outward, as indicated in dot-dash outline in Fig. 1, so that the entire pre-plasticizing unit and nozzle may be readily accessible without dismantling the machine. It will be readily appreciated that a machine to handle large plastic moldings for the production of molded plastic articles, which has heretofore been impractical and unprofitable because of the size and cost of such a machine.

We claim:

1. In a molding machine having an injection cylinder and means for injecting material therefrom into a mold, a base, upstanding members formed on said base and having tie rods therebetween, a movable member positioned on said tie rods and having a fluid cylinder and ram therein, a second fluid cylinder and ram connected with said movable member and to one of said upstanding members for moving said member a predetermined distance, said first mentioned cylinder being relatively large in diameter and said second mentioned fluid cylinder being relatively small in diameter, means responsive to reverse movement of said small cylinder for expelling the fluid from said relatively large cylinder, and means for locking said movable member in place when moved said predetermined distance.

2. In a molding machine having an injection cylinder and means for injecting material therefrom into a mold, a base, upstanding members formed on said base and having tie rods therebetween, a movable member positioned on said tie rods and having a fluid cylinder and ram therein, a second fluid cylinder and ram connected with one of said upstanding members and with said movable member for moving said member a predetermined distance, said first mentioned cylinder being relatively large in diameter and said second mentioned fluid cylinder being relatively small in diameter, lever means for expelling the fluid from said relatively large cylinder upon reverse movement of said small cylinder, and means for locking said movable member in place against rearward movement when said member is moved to a predetermined position.

3. In a clamping assembly for molding machines and the like, a base, a first member normally fixed on said base, a second member normally fixed on said base, tie rods extending between and secured in relation to said members, a movable mold contacting and supporting unit which includes a first section positioned on and slidably guided by said tie rods and an adjacent second section positioned on and slidably guided by said tie rods, whereby both sections are held by the tie rods in accurate parallel relationship, the first section being formed and adapted to support a mold, in opposition to and cooperation with said first member, power means positioned and adapted to move the two sections in unison along the tie rods toward the first member, the two sections having interpenetrating portions forming a cylinder and a piston penetrating the cylinder, and means effective upon a predetermined movement of the two sections along the tie rods toward the first member, for delivering an incompressible fluid under pressure to the cylinder space thus provided, and for thereby moving the first section in relation to the second section and toward the first member.

4. The structure of claim 3 characterized in that the power means for moving the two sections including an hydraulic cylinder and a piston therein.

5. The structure of claim 3 characterized by and including automatic control means adapted to initiate the admission of fluid under pressure to the space within the cylinder and piston in response to a predetermined unitary movement of the sections along the tie rods and toward the first member.

6. The structure of claim 3 characterized by and including means intermediate the second section and the second member for holding the sections against retrograde movement toward the second member after the unit has completed a predetermined movement toward the first member.

7. The structure of claim 3 characterized by and including compression means between the second section and the second member, and means for rendering said compression means operative after a predetermined movement of the sections toward the first member, to prevent retrograde movement of the second section during the molding operation.

8. In a molding machine, a base, front and rear upstanding members formed on said base and having tie rods extending therebetween, a movable mold-contacting and supporting device including a pair of normally abutting but relatively movable sections positioned on said tie rods, one of said sections being formed and adapted to contact and support a mold in cooperation with the front member, power means adapted to move said sections with relation to each other, power means connected to said mold-contacting device and to one of said upstanding members for moving said mold-contacting and supporting device through a predetermined distance to a predetermined position, both of said relatively movable sections being slidably supported on the tie rods in guided relationship, a lock plate positioned for movement intermediate said movable device and the rear upstanding member, said lock plate being movable to a position precluding rearward movement of said mold-contacting device.

9. In a molding machine having an injection cylinder and means for ejecting material therefrom into a mold, a base, upstanding front and rear members formed on said base and having tie rods extending therebetween and connecting them, a movable mold-contacting and supporting device including a pair of relatively movable sections each of which is slidably positioned on said tie rods in sliding guided relationship, the one of said sections being formed and adapted to contact and support a mold adjacent the front upstanding member, said sections having opposed abutment portions adapted to impart movement to the one section in response to movement of the other section, power means for moving said sections in unison through a predetermined travel toward the front upstanding member, means effective at the end of said predetermined travel for locking said sections against retrograde movement toward the rear upstanding member including a locking plate movable into position between the rear of the relatively movable sections and the upstanding rear member, said sections having interpenetrating portions defining with one another a piston and cylinder means adapted to move the first of said sections forwardly in relation to the second of said sections and toward the front upstanding member.

10. In a clamping assembly for molding machines and the like, a first support, a second support, tie rods extending between and secured in relation to said supports, a movable mold contacting and supporting unit which includes a first section positioned on and slidably guided by said tie rods, and an adjacent second section positioned on and slidably guided by said tie rods, whereby both sections are held by the tie rods in accurate, parallel relationship, the first section being formed and adapted to support a mold, in opposition to and in cooperation with said first support, power means positioned and adapted to move the two sections in unison along the tie rods toward the first support, means for forming a liquid-tight chamber between said sections, and means effective, upon a predetermined unitary movement of the two sections along the tie rods toward the first support, for delivering an incompressible fluid under pressure to the interior of said chamber, and for thereby moving the first section in relation to the second section and toward the first support.

11. The structure of claim 10 characterized by and including means for preventing undesired retrograde movement of the first section toward the second support, including a locking element positioned for movement into and out of locking position between said second section and said second support.

12. A mold-contacting and supporting assembly for use with molding machines having tie rods, including a first mold-contacting and supporting member adapted to be mounted for movement along said rods, a second member adapted to be mounted for movement along said rods, in guided and parallel relationship with the first member, means for forming a liquid-tight chamber between said sections, means for moving said members along the rods toward a predetermined position, means responsive to a predetermined movement of the members along the rods, for delivering an incompressible fluid under pressure to the interior of the chamber, and for thereby moving the first member in relation to the second member, and along said rods at the end of said predetermined movement of the members along the rods, and means for preventing retrograde movement of the second member during said movement of the first member in relation to said second member in response to admission of the incompressible fluid.

13. In a clamping assembly for a molding machine, a first fixed member arranged to support one part of a mold, a second adjustable fixed member connected to the first fixed member by means of tie rods, a movable member having two relatively movable sections defining a chamber therebetween with one section facing the first fixed member and arranged to support the other part of the mold, and the second section facing the second adjustable fixed member, both of said sections slidably mounted on said tie rods, means responsive to a predetermined movement of the members along the rods for delivering an incompressible fluid under pressure to the chamber between the two sections, whereby to advance the first section from the second section and toward the mold supporting fixed member, and power means for providing relative movement between said second section of the movable member and the adjustable fixed member.

14. In a clamping assembly for a molding machine, a first fixed member arranged to support one part of a mold, a second adjustable fixed member connected to the first fixed member by means of tie rods, a movable member having two relatively movable sections defining a chamber therebetween with one section facing the first fixed member and arranged to support the other part of the mold, and the second section facing the second adjustable fixed member, both of said sections slidably mounted on said tie rods, means responsive to a predetermined movement of the members along the rods, for delivering an incompressible fluid, under pressure, to the chamber between the two sections, whereby to advance the first section from the second section and toward the mold supporting fixed member, power means for providing relative movement between said second section of the movable member and the adjustable fixed member, and means positioned between said second section of the movable member and the adjustable fixed member for preventing relative movement therebetween.

15. An injection molding machine comprising, in combination: a stationary platen for holding a first mold part in a stationary position, a plurality of tie rods secured in parallelism to said stationary platen extending substantially beyond the position of the stationary mold part; a header secured to the tie rods to form, between the header and the stationary platen, a substantial space for the operation and occupancy of moving parts of the machine between a retracted position adjoining the header and a molding position adjoining the first platen; means providing a first cylinder secured to the header on the opposite side of the header from the space, a piston in said cylinder, a second platen slidably mounted on said tie rods in said formed space for supporting a movable mold part opposite the stationary mold part; means, including a piston rod extending through the header, securing the first piston to the second platen for movement of both the piston and the platen as a rigid unit to and away from the stationary platen; means providing a second cylinder secured to the second platen; a second piston in said second cylinder, a plurality of thrust rods secured to said second piston and extending therefrom in parallelism with the tie rods and the piston rod, means providing passages for said thrust rods to pass beyond the header from said formed space; means for blocking the passage for said thrust rods so as to cause the rods to abut said means for blocking the passage and fix the position of the second piston with respect to the first and second platens and means for conducting a fluid under pressure to the second piston and cylinder to drive the second platen to move the mold parts together.

16. An injection molding machine comprising, in combination: a stationary platen for holding a first mold part in a stationary position, a plurality of tie rods secured in parallelism to said stationary platen extending substantially beyond the position of the stationary mold part; a header secured to the tie rods to form, between the header and the stationary platen, a substantial space for the operation and occupancy of moving parts of the machine between a retracted position adjoining the header and a molding position adjoining the first platen; means providing a first cylinder secured to the header on the opposite side of the header from the space, a piston in said cylinder, a second platen slidably mounted on said tie rods in said formed space for supporting a movable mold part opposite the stationary mold part; means, including a piston rod extending through the header, securing the first piston to the second platen for movement of both the piston and platen as a rigid unit to and away from the stationary platen; means providing a second piston and cylinder assembly secured to the second platen, a plurality of thrust rods secured to said second piston and cylinder assembly, means providing passages for said thrust rods to pass beyond the header from said space, means to abut said thrust rods against the header to prevent movement of the rods through said passages and means for conducting a fluid under pressure to the second piston and cylinder to drive the second platen to move the mold parts together.

17. A mold locking mechanism for injection molding and like machines, comprising a frame formed with an abutment, an extensible assembly including a hydraulic cylinder and piston assembly carried by said frame for endwise reciprocation toward and away from such abutment and adapted to carry a mold block thereon on the end remote from such abutment, power means connected to the other end of said assembly for reciprocating the latter, a compression member carried by said assembly for movement into and out of a position interposed between said assembly and such abutment, means interconnecting said member and said power means whereby the latter actuates the former, said extensible assembly constituting a power means for extending said assembly to impose compressive stress on said compression member for opposing movement of said assembly and thus a mold block adapted to be carried thereby toward such abutment, one element of said hydraulic cylinder and piston assembly being connected to said first power means and the other element thereof adapted to carry said mold block.

18. A mold actuating mechanism for injection molding and like machines, comprising a frame including opposed abutments, a hydraulic cylinder and piston assembly mounted for bodily endwise reciprocation between such abutments including a piston element and a cylinder element, a compression member connected at one end to one of said elements of said assembly for movement of the outer end into and out of abutting relation with one of such abutments, hydraulically actuated power means connected to said compression member for reciprocating said assembly and actuating said compression member, a pair of opposed mold blocks respectively carried by the other of such abutments and the other of said elements of said assembly, and means for supplying fluid under pressure into said assembly whereby to tend to cause movement of said cylinder and piston elements in opposite directions to impose compressive stress on said compression member against such one abutment and to lock said mold blocks in engagement with each other.

19. The structure according to claim 18 further characterized in that fluid pressure actuated means are provided for injecting plasticized material into the mold cavity formed between said mold blocks, and that control means for said injecting means are provided which includes a fluid pressure actuated element responsive to build up of a predetermined pressure in said assembly.

References Cited in the file of this patent
UNITED STATES PATENTS

| Number | Name | Date |
|---|---|---|
| 1,466,490 | Swenson | Aug. 28, 1923 |
| 1,880,380 | Frantz | Oct. 4, 1932 |
| 2,334,372 | Abbott et al. | Nov. 16, 1943 |
| 2,360,000 | Lawyer | Oct. 10, 1944 |
| 2,367,144 | Shaver | Jan. 9, 1945 |
| 2,372,833 | Jobst | Apr. 3, 1945 |
| 2,374,468 | Von Opel | Apr. 24, 1945 |
| 2,379,738 | Morin | July 3, 1945 |
| 2,402,805 | Cousino | June 25, 1946 |
| 2,410,324 | Windsor et al. | Oct. 29, 1946 |
| 2,416,406 | Roehri | Feb. 25, 1947 |
| 2,423,914 | Wacker | July 15, 1947 |
| 2,433,132 | Lester | Dec. 23, 1947 |
| 2,437,109 | Maquat | Mar. 2, 1948 |
| 2,480,313 | Alden | Aug. 30, 1949 |
| 2,481,991 | Ernst | Sept. 13, 1949 |
| 2,484,344 | Hiller et al. | Oct. 11, 1949 |
| 2,484,907 | Purcell | Oct. 18, 1949 |
| 2,485,290 | Jelinek | Oct. 18, 1949 |
| 2,487,426 | Cousino | Nov. 8, 1949 |
| 2,566,857 | Sayre | Sept. 4, 1951 |

FOREIGN PATENTS

| 574,639 | Great Britain | June 29, 1944 |